United States Patent
Ortiz Segovia et al.

(10) Patent No.: US 8,861,038 B2
(45) Date of Patent: Oct. 14, 2014

(54) METHOD FOR COMBINING DIRECT BINARY SEARCH HALFTONING WITH INK SAVING

(71) Applicant: OCE Technologies B.V, Venlo (NL)

(72) Inventors: Maria V. Ortiz Segovia, Paris (FR); Jan P. Allebach, West Lafayette, IN (US); Nicolas P.M.F. Bonnier, Paris (FR)

(73) Assignee: Oce-Technologies, B.V., Venlo (NL)

( * ) Notice: Subject to any disclaimer, the term of this patent is extended or adjusted under 35 U.S.C. 154(b) by 42 days.

(21) Appl. No.: 13/734,370

(22) Filed: Jan. 4, 2013

(65) Prior Publication Data
US 2013/0188204 A1 Jul. 25, 2013

(30) Foreign Application Priority Data
Jan. 20, 2012 (EP) .................................... 12305074

(51) Int. Cl.
H04N 1/52 (2006.01)
H04N 1/58 (2006.01)
G06K 15/02 (2006.01)
H04N 1/60 (2006.01)

(52) U.S. Cl.
CPC .............. *G06K 15/1878* (2013.01); *H04N 1/52* (2013.01); *H04N 1/6022* (2013.01)
USPC ............................ 358/3.26; 358/521; 358/534

(58) Field of Classification Search
None
See application file for complete search history.

(56) References Cited

U.S. PATENT DOCUMENTS

| 5,812,744 | A | 9/1998 | Allebach et al. |
| 6,233,061 | B1 | 5/2001 | Huang et al. |
| 6,563,957 | B1 * | 5/2003 | Li et al. ......................... 358/3.03 |
| 7,224,487 | B2 | 5/2007 | Gupta et al. |
| 8,282,182 | B2 * | 10/2012 | Chandu et al. ............... 358/3.06 |
| 2002/0196454 | A1 | 12/2002 | Atkins et al. |

OTHER PUBLICATIONS

Agar et al., "Model-Based Color Halftoning Using Direct Binary Search", IEEE Transactions of Image Processing, vol. 14, No. 12, Dec. 2005, pp. 1945-1959.
He, "Hierarchical Colorant-Based Direct Binary Search Halftoning", IEEE Transactions on Image Processing, vol. 19, No. 7, Jul. 2010, pp. 1824-1836.
Lee et al., "Colorant-based direct binary search halftoning", Journal of Electronic Imaging 11(4), Oct. 2002, pp. 517-527.

* cited by examiner

*Primary Examiner* — Scott A Rogers
(74) *Attorney, Agent, or Firm* — Birch, Stewart, Kolasch & Birch

(57) ABSTRACT

A method for printing an image with colour pixels is disclosed. This method optimizes the print quality for a selected level of ink usage by maximizing a dot-off-dot strategy and separating between direct binary search dot patterns for a number of selected colorants in a printer comprising black colorant. Ink usage is controlled by determining the fraction of coinciding printer colorants that may be substituted by black colorant. The perceived error between the image pixels and the image dot pattern is minimized according to a human visual system model that excludes non-homogeneous patterns that affect the quality of the halftone textures. Dots for other colorants are processed independently and added to the obtained halftone dot pattern for the selected colorants.

13 Claims, 2 Drawing Sheets

METHOD FOR COMBINING DIRECT BINARY SEARCH HALFTONING WITH INK SAVING

FIELD OF THE INVENTION

The invention relates to a method for printing an image comprising colour pixels by deriving a dot pattern for applying dots on print positions in a printer comprising a black colorant for printing black dots, the printer comprising further colorants that, printed in combination, also result in black dots, the method comprising the steps of separating a pixel colour into a number of printer colorant amounts, determining an amount of black that results from coinciding printer colorants, establishing an amount of black colorant substituting a fraction of the coinciding printer colorants based on the determined amount of black, deriving a dot pattern from these amount of colorants and applying colorant ink on print positions according to the dot pattern. The invention further relates to a print system that is configured to use the invented method.

BACKGROUND OF THE INVENTION

Printable colour images comprise pixels that indicate an amount of colour. Often these colour pixels have three components, indicating e.g. an amount of red, green and blue. The colour components do not necessarily correspond with the colorants in a printer. If the number of colorants in the printer is the same as the number of colour components, there is a one-to-one relation between the colour components and the colorants in the printer. Often a printer has more colorants to obtain a larger gamut, which is the full set of printable colours. Most common are printers employing cyan (C), magenta (M), yellow (Y) and black (K) ink. Ink here includes liquid ink, wax, and dry ink or toner. In the case of more colorants there are multiple ways to apply the colorants to create a similar colour on a print position, which indicates a position on a receiving medium in the printer where an amount of colorant may be applied. A well known example is the use of gray component replacement (GCR) and under colour removal (UCR), in which parts of cyan (C), magenta (M) and yellow (Y) may or may not or may partly be substituted by black colorant (K). This substitution results in a reduction of ink usage, but the visual quality of a printed document may also be affected. An extensive use of black ink by ink saving methods not only puts pastels and skin tones in risk of developing a grainy appearance, but also increases the visibility of printing artifacts and decreases the vividness of colors. Depending on the contents of a document, or the objects in a document, print quality may be exchanged for ink saving and vice versa. The same applies for other ink saving methods, such as draft mode mode technology in which e.g. only alternate dots of an image are printed.

In U.S. Pat. No. 7,224,487 entitled "Ink reduction error diffusion" a waste colour remover (WCR) is disclosed which analyses the colour data, after a halftoning step, such as error diffusion or dithering, to determine redundant colour data. This module eliminates non-black dots, if multiple dots of colour are intended for the same print position as a black dot. The non-black dots can be eliminated without compromising the output image integrity. Some further particular cases are considered in which removing colorant is not beneficial. Nevertheless, the performance of the method depends strongly on the choice of ink combinations contained in a subset used during the quantization, or halftoning step.

In general, ink saving methods may be applied during the colour management stage of a printing workflow. Depending on the colours involved more or less ink saving may be applied. In U.S. Pat. No. 6,233,061 entitled "Ink reduction device and method for a color inkjet printer" an output colour profile is based on the colour distance between a reduced ink composition of a colour and its full ink composition. This provides an efficient method to reduce the excess colour ink placed on a substrate without impairing the visually distinguishable colour range of a printer.

However, besides colour matching, more print quality aspects are involved when ink saving is applied. These aspects comprise graininess and sharpness of the image, which are related to the placement of dots in the image. A different optimum may be found for different type of images, or type of objects in an image, such as text and pictorial images. A problem exists in compensating various aspects of print quality when a predefined level of ink usage for a type of object is set. An object of the present invention is to maintain visual print quality when controlling the percentage of ink usage.

SUMMARY OF THE INVENTION

According to the present invention, a method for printing an image is disclosed in which from the image a coloured dot pattern is derived for applying dots on print positions in a printer comprising a black colorant for printing black dots, the printer comprising further colorants that, printed in combination, also result in black dots, the method comprising the steps of separating a pixel colour into a number of printer colorant amounts; determining an amount of black that results from coinciding printer colorants; establishing an amount of black colorant substituting a fraction of the coinciding printer colorants based on the determined amount of black; deriving a total dot coverage for every pixel of the image from a sum of at least three amounts of colorants, including the amount of black colorant; establishing an image dot pattern in accordance with the total dot coverage, wherein a perceived error between the image pixels and the image dot pattern is minimized; establishing a dot colour, selected from the printer colorants, for every dot in the image dot pattern in accordance with the amounts of printer colorants in the image, thereby obtaining a coloured dot pattern; swapping a number of dot colours in order to minimize the perceived error between the colour of the pixels in the image and the coloured dot pattern; adding dots of colorants that are not comprised in the total dot coverage by either independently deriving a halftone pattern for a colorant or adding dots on print positions not yet comprising a dot according to the coloured dot pattern, thereby obtaining a printable dot pattern for each colorant in the printer; and applying colorant ink on print positions according to the dots in the printable dot pattern. By minimizing a perceived error between the image pixels and the image dot pattern according to a human visual system model visually non-homogeneous patterns that affect the quality of the halftone textures are excluded and an optimal print quality for a predefined percentage of ink usage is obtained.

The invention further encompasses a print system comprising a printer with a black colorant for printing black dots, the printer comprising further colorants that, printed in combination, also result in black dots, the print system comprising calculation means that is configured to derive from an image a coloured dot pattern for printing dots on print positions in the printer according to the invented method.

Further object, features and advantages of the method and the print system will be apparent from the claims and from the more particular description of the exemplary embodiments of the method and the print system, as illustrated in the accompanying drawings in which like reference numbers refer to the same parts throughout the different figures. The drawings are not necessarily to scale, emphasis instead being placed upon illustrating the principle of the invention.

BRIEF DESCRIPTION OF THE DRAWINGS

Hereinafter the present invention is further elucidated with references to the appended drawings showing non-limiting embodiments and wherein.

DETAILED DESCRIPTION OF EMBODIMENTS

Figure 1:
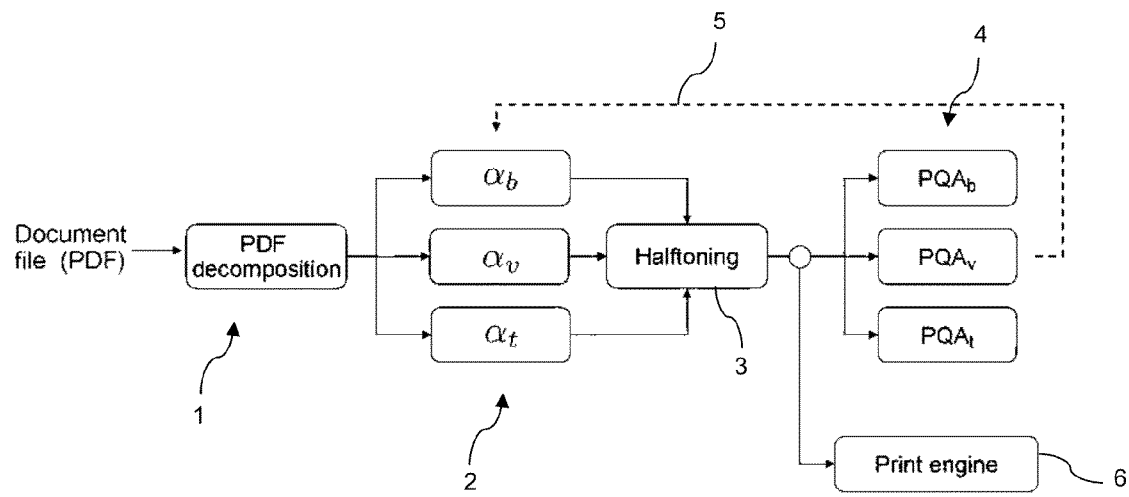
FIG. 1 shows the main components for an ink-saving strategy.

In FIG. 1 the main components of the invented ink-saving strategy for a CMYK printer are shown. After a document file is received in a PDF decomposition module 1, it is decomposed into regions corresponding to bitmap or pictorial image (b), vector (v) and text (t) information. Vector information refers to line drawings and further drawings generated by a CAD-application. For each of these regions a different percentage for CMY colorant replacement by K is applied in the colour separation module 2. The resulting image is the input for a halftoning module 3 that determines a dot pattern that is adapted to the image using a Direct Binary search (DBS) and a human visual system model to evaluate the fit between the dot pattern and the image. In a further module 4 a number of Print Quality Attributes, such as graininess, smoothness and sharpness are evaluated. Each region may be associated with different weight factors for the various attributes. A feedback loop 5 may be necessary to adjust the ink saving parameters of module 2 to control a minimum value of the print quality. The halftoned image is sent to the print engine 6 for reproduction on a receiving medium.

The colour separation module 2 separates 8 planes for each of the regions that take a different value for a factor a that denotes the percentage of CMY substitution. For $\alpha=1$ the most aggressive case of CMY substitution is obtained, where a high amount of black ink is laid down on the paper. On the other hand if $\alpha=0$ a CMY printer is obtained for which the black ink (K) is not used. A pixel has initially the colour components r, g, and b, also known as the initial pixel triplet. Then the gray component of the triplet and the required amount of the secondary colours R', G', and B' are found. Finally the colour separation is represented by the 8-tuplet (C', M', Y', R', G', B', K', P'). Each component represents an amount of single ink (C', M', Y', K'), double ink (R', G', B') or triple ink layer (P'). Mathematically these separations are found from the following equation:

$$1.\ c1 = 1 - r,\ m1 = 1 - g,\ y1 = 1 - b,\ k1 = \alpha \min\{c1, m1, y1\} \quad (1)$$

$$2.\ c2 = c1 - k1,\ m2 = m1 - k1,\ y2 = y1 - k1,$$

$$t2 = \max\{c2 + m2 + y2 - 2(1-k1), 0\}$$

$$3.\ c3 = c2 - t2,\ m3 = m2 - t2,\ y3 = y2 - t2,$$

-continued $$t3 = \max\{c3 + m3 + y3 - (1-k1-t2), 0\}$$

$$4.\ b4 = t3 - \min\{t3, y3\},\ t4 = t3 - b4,$$

$$c4 = c3 - b4,\ m4 = m3 - b4,\ y4 = y3$$

$$5.\ P' = t2,\ R' = t4 - \min\{t4, c4\},\ G' = t4 - R',\ B' = b4,$$

$$C' = c4 - G',\ M' = m4 - R',\ Y' = y4 - R' - G',\ K' = k1$$

Figure 2:
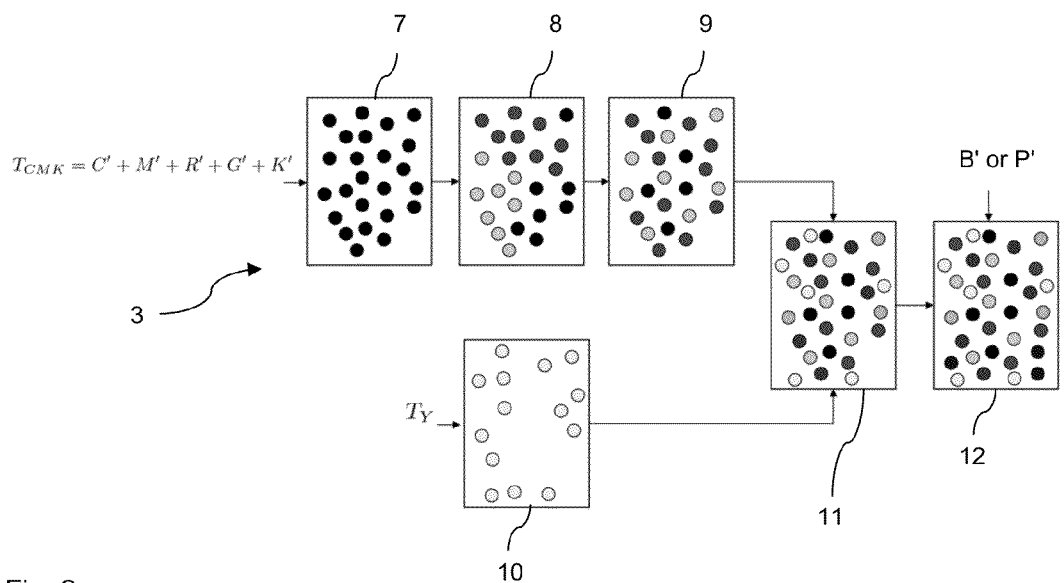
FIG. 2 shows the various elements of the invented halftoning module.

In FIG. 2 the halftoning module 3 is elucidated by the various steps that are taken to determine an printable dot pattern. First, a homogeneous binary pattern is set for a total dot coverage of the colorants C, M, and K represented by $T_{CMK}=C'+M'+R'+G'+K'$. Note that C' indicates a single ink layer of C and G' indicates a layer of C that is to be complemented by Y. Therefore in $T_{CMK}$ both C' and G' contribute. In the same way M' and R' are involved. K' is the amount of black colorant.

The dot pattern 7 is found by a Direct Binary Search on the $T_{CMK}$ plane, meaning a dot pattern is created that follows the intensity of $T_{CMK}$. Then, in 8 the algorithm colours dots with C, M, or K in such a way that each colorant plane has a uniform texture and without altering the total and the individual dot distributions. After the composite texture is colored, a swap-only DBS is applied in 9. Swap-only DBS visits iteratively each dot that has a random C, M, or K assignment and swaps it with a neighbor that has a different colour. A trial swap is accepted if it decreases an error metric. This error metric is known from the literature (T. Flohr et al. "Model based color image quantization", Proc. SPIE. Human Vision, Visual Proc. and Digital Display IV (vol. 1913) (1993) pp. 270-281). When no changes are accepted during a single iteration, the algorithm has converged.

The yellow dot pattern is separately generated, 10, from a total yellow coverage $T_Y=Y'+R'+G'$. A Direct Binary Search for a dot pattern for this coverage is optimally uniformly fitting the image. The two dot patterns are overlapped in process 11. Finally the double layer C over M giving blue (B') and composite black (P') is added in 12 on the positions without a dot. The following procedure is used:

Total coverage $T_{CMK}$ less than or equal to 100%, B'=0 and P'=0. Nothing should be printed.

Total coverage $T_{CMK}$ greater than 100% but less than 200%, B'>0 and P'=0. All pixel locations where $T_{CMK}=0$ will be printed with both C and M, i.e. blue.

Total coverage $T_{CMK}$ greater than 200%, B'=0 and P'>0. All pixel locations where $T_{CMK}=0$ will be printed with all three colorants C, M, and Y, i.e. process black.

Total coverage greater than 200% and B'>0 and P'>0. The decision whether to print blue or process black is given by:

if B'/(B'+P')>r, print C and M, else, print C, M, and Y, where r is a random number between 0 and 1.

This procedure strives to maximize the dot-off-dot cases. Note that we never print C and K, or M and K together. The Y total colorant coverage $T_Y$ is carried out independently by classic DBS. Since Y is much less visible than C and M are, overlapping the textures of $T_Y$ and $T_{CMK}$ at the end of the process generates visually imperceptible artifacts.

The DBS algorithm is a complex method and here we have only described the modifications that are needed to extend the already known classic DBS. For a throughout description of classic DBS we refer to D. J. Lieberman et al. "A dual interpretation for direct binary search and its implications for tone reproduction and texture quality", IEEE Transactions on Image Processing 9 (11,200) pp. 1950-1963. It is further noted that the DBS algorithm is computationally expensive. Therefore it is beneficial to restrict the number of colorant planes as in the embodiment outlined above. The use of the total coverage $T_{CMK}$ as indicated improved the print quality beyond expectation. A further reduction of computation may be obtained by the preparation of a number of threshold matrices based on the DBS algorithm. In an embodiment a threshold matrix for the $T_{CMK}$-plane is pre-calculated and the dot pattern 7 is found by a familiar dithering algorithm. In a further embodiment there are different threshold matrices for different regions in the document, based on the object type of the region.

Figure 3:
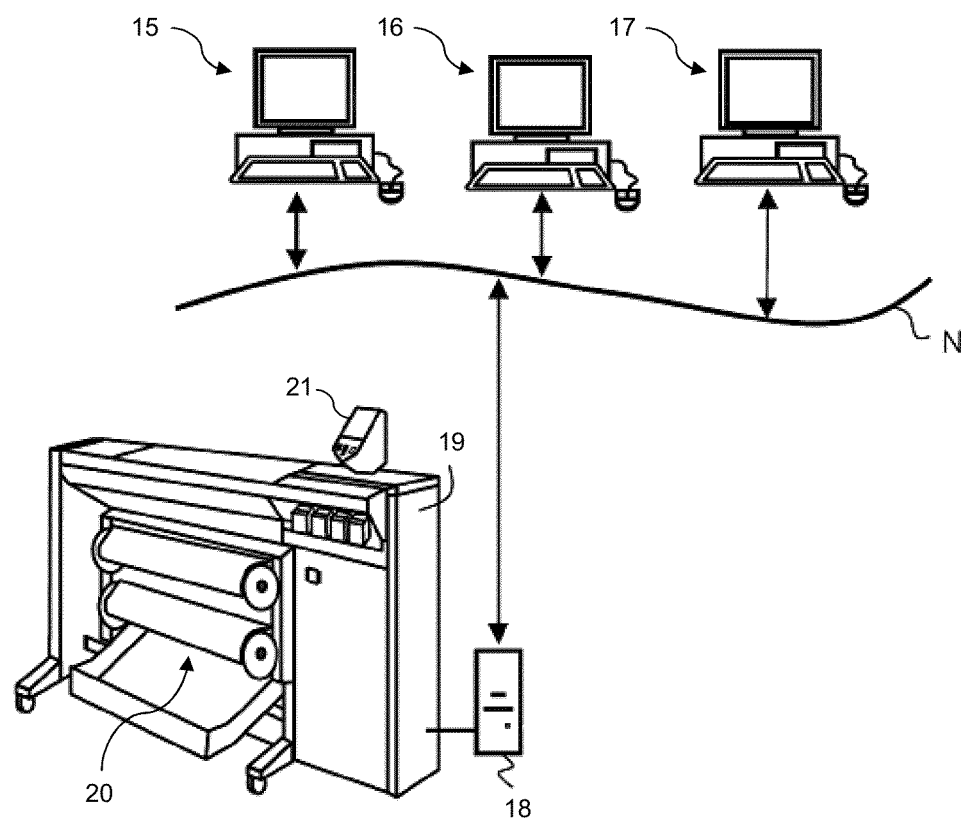
FIG. 3 is a printing system for printing an image according to the invention.

FIG. 3 shows a printing system for printing image data on a selected receiving medium. The image data are prepared for submission to a CMYK print engine on a client computer 15, 16, 17, such as a personal computer or a mobile communication device, which is connected to a network N, either by a wire connection or in a wireless way. A controller 18, or Digital Front End, is receiving the image data, in the form of a PDF document, with print parameters indicating a preferred manner of printing the image, including a selection of a medium on which the image is to be printed. The controller 18 processes the image data into print data according to the invented method and sends the print data to the print engine 19. The print engine comprises positions for receiving media 20. After changing a medium, the user interface 21 is applied to indicate which medium has been introduced on a media position 20 of the print engine. This information is shared with the controller 18. The controller 18 may associate different set of values for the ink-saving parameters a with different selected receiving media.

The above disclosure is intended as merely exemplary, and not to limit the scope of the invention, which is to be determined by reference to the following claims.

The invention claimed is:

1. A method for printing an image comprising colour pixels by deriving from the image a coloured dot pattern for applying dots on print positions in a printer comprising a black colorant for printing black dots, the printer comprising further colorants that, printed in combination, also result in black dots, the method comprising the steps of:
    separating a pixel colour into a number of printer colorant amounts;
    determining an amount of black that results from coinciding printer colorants;
    establishing an amount of black colorant substituting a fraction of the coinciding printer colorants based on the determined amount of black;
    deriving a total dot coverage for every pixel of the image from a sum of at least three amounts of colorants, including the amount of black colorant;
    establishing an image dot pattern in accordance with the total dot coverage, wherein a perceived error between the image pixels and the image dot pattern is minimized;
    establishing a dot colour, selected from the printer colorants, for every dot in the image dot pattern in accordance with the amounts of printer colorants in the image, thereby obtaining a coloured dot pattern;
    swapping a number of dot colours in order to minimize the perceived error between the colour of the pixels in the image and the coloured dot pattern;
    adding dots of colorants that are not comprised in the total dot coverage by either independently deriving a halftone pattern for a colorant or adding dots on print positions not yet comprising a dot according to the coloured dot pattern, thereby obtaining a printable dot pattern for each colorant in the printer, and
    applying colorant ink on print positions according to the dots in the printable dot pattern.

2. The method according to claim 1, wherein the step of establishing an amount of black colorant is dependent on an object type of an object that is associated with the colour pixel in the image.

3. The method according to claim 2, wherein an object type is selected from the object types bitmap, vector and text.

4. The method according to claim 1, wherein the printer comprises the colorants black (K), cyan (C), magenta (M), and yellow (Y).

5. The method according to claim 4, wherein a total dot coverage is derived for the colorants black (K), cyan (C), and magenta (M).

6. The method according to claim 5, wherein the print positions on which both a cyan (C) dot, and a magenta (M) dot are applied, are derived from the print positions not yet comprising a dot according to the coloured dot pattern.

7. A print system comprising a printer with a black colorant for printing black dots, the printer comprising further colorants that, printed in combination, also result in black dots, the print system comprising calculation means that is configured to derive from an image a coloured dot pattern for printing dots on print positions in the printer according claim 1.

8. The print system according to claim 7, wherein a set of ink saving parameters for establishing an amount of black colorant is dependent on a receiving medium on which the print data are printed.

9. A print system comprising a printer with a black colorant for printing black dots, the printer comprising further colorants that, printed in combination, also result in black dots, the print system comprising calculation means that is configured to derive from an image a coloured dot pattern for printing dots on print positions in the printer according to claim 2.

10. A print system comprising a printer with a black colorant for printing black dots, the printer comprising further colorants that, printed in combination, also result in black dots, the print system comprising calculation means that is configured to derive from an image a coloured dot pattern for printing dots on print positions in the printer according to claim 3.

11. A print system comprising a printer with a black colorant for printing black dots, the printer comprising further colorants that, printed in combination, also result in black dots, the print system comprising calculation means that is configured to derive from an image a coloured dot pattern for printing dots on print positions in the printer according to claim 4.

12. A print system comprising a printer with a black colorant for printing black dots, the printer comprising further colorants that, printed in combination, also result in black dots, the print system comprising calculation means that is configured to derive from an image a coloured dot pattern for printing dots on print positions in the printer according to claim 5.

13. A print system comprising a printer with a black colorant for printing black dots, the printer comprising further colorants that, printed in combination, also result in black dots, the print system comprising calculation means that is configured to derive from an image a coloured dot pattern for printing dots on print positions in the printer according to claim 6.

* * * * *